United States Patent [19]

Cheng

[11] Patent Number: 5,050,782

[45] Date of Patent: Sep. 24, 1991

[54] MEASURED VOLUME LIQUID DISPENSER HAVING A ROTATABLE PLUNGER WITH A RADIAL PROJECTION FOR SELECTIVELY ENGAGING ONE OF A PLURALITY OF AXIAL CHANNELS FORMED IN THE PUMP CYLINDER

[75] Inventor: David H. Cheng, Saratoga, Calif.

[73] Assignee: Linda J. Wei, Saratoga, Calif.

[21] Appl. No.: 510,910

[22] Filed: Apr. 18, 1990

[51] Int. Cl.⁵ ............................................. G01F 11/06
[52] U.S. Cl. ................................... 222/309; 222/321; 222/385; 92/13.4
[58] Field of Search ................. 222/309, 383, 384, 43, 222/49, 50, 41, 47, 385, 321; 92/13, 13.4; 73/864.18; 604/208, 210

[56] References Cited

U.S. PATENT DOCUMENTS

| | | | |
|---|---|---|---|
| 1,495,772 | 5/1924 | Brown | 92/13.4 |
| 1,724,766 | 8/1929 | McCauley . | |
| 1,917,678 | 7/1933 | Wheeler . | |
| 2,123,737 | 7/1938 | Lewis . | |
| 2,521,433 | 9/1950 | White . | |
| 2,605,763 | 8/1952 | Smoot | 222/43 X |
| 3,097,763 | 7/1963 | Aluotto | 222/309 X |
| 3,101,751 | 8/1963 | Ballin | 222/43 X |
| 3,458,090 | 7/1969 | Scoggin, Jr. . | |
| 3,492,876 | 2/1970 | Bull et al. | 222/309 X |
| 3,556,353 | 1/1971 | Echols | 222/309 |
| 3,653,556 | 4/1972 | Moran et al. . | |
| 3,863,807 | 2/1975 | Shapiro et al. . | |
| 4,081,111 | 3/1978 | Sandow | 222/309 |
| 4,096,751 | 6/1978 | Withers et al. | 222/43 X |
| 4,185,755 | 1/1980 | Sachs et al. | 222/43 |
| 4,358,027 | 11/1982 | Poitras . | |
| 4,433,709 | 2/1984 | Corsette | 222/309 |
| 4,445,626 | 5/1984 | Steffen et al. | 222/309 X |
| 4,456,152 | 6/1984 | Young et al. | 222/309 |
| 4,526,294 | 7/1985 | Hirschmann et al. | 222/309 X |
| 5,007,757 | 4/1991 | Iizuka | 222/309 X |

FOREIGN PATENT DOCUMENTS 528894  5/1954  Belgium ............................ 222/309

Primary Examiner—Michael S. Huppert
Assistant Examiner—Kenneth DeRosa
Attorney, Agent, or Firm—Townsend and Townsend

[57] ABSTRACT

A liquid dispenser includes a plunger and an elongate barrel having a cylindrical bore which receives the plunger. The plunger includes an axial passage which delivers a volume of liquid as the plunger is depressed downwardly into the barrel. The volume of liquid delivered depends on the length of the downstroke of the plunger, and a mechanism is provided which allows the plunger to be rotated to limit the length of the downstroke to a predetermined percentage of total length. In this way, premeasured volumes of liquid may be delivered by the dispenser.

8 Claims, 3 Drawing Sheets

MEASURED VOLUME LIQUID DISPENSER HAVING A ROTATABLE PLUNGER WITH A RADIAL PROJECTION FOR SELECTIVELY ENGAGING ONE OF A PLURALITY OF AXIAL CHANNELS FORMED IN THE PUMP CYLINDER

BACKGROUND OF THE INVENTION

The present invention relates generally to apparatus for dispensing liquids, and more particularly, to apparatus which are capable of selectively delivering premeasured volumes of liquid.

Liquid dispensing devices are used for a variety of purposes in domestic, industrial, and scientific environments. A common type of liquid dispenser employs a plunger in a barrel where the liquid is forced out of a nozzle connected to the plunger as the plunger is depressed. Such plunger-type liquid dispensers are ubiquitous and employed to deliver a variety of substances, such as reagents, diluents, soaps, emollients, oils, and the like.

Of particular interest to the present invention are plunger-type liquid dispensers which have been adapted to provide delivery of premeasured liquid volumes where the precise volume may be selected by adjusting the dispenser mechanism in some manner. Usually, the dispensers are modified so that the stroke or travel of the plunger may be limited so that the delivered volume of liquid may be selected to be some particular percentage of the maximum delivery volume achieved with a full stroke of the plunger.

A variety of mechanisms for limiting the stroke or travel of a plunger in a plunger-type liquid dispenser has been proposed. Most simply, an adjustable collar or stop member may be placed on the plunger shaft in order to physically limit the available length of travel. Usually, calibration marks are placed on the shaft so that the collar or stop member may be aligned with the marks in order to provide a desired volumetric delivery. Such liquid dispensers are described in U.S. Pat. Nos. 3,653,556; 3,863,807; and 4,358,027. The '556 and '807 patents each disclose a movable collar placed on the external portion of the plunger shaft, while the '027 patent discloses a stop member formed internally to the plunger assembly.

While the use of an adjustable collar or stop member is a particularly straight forward mechanical solution to the problem of limiting plunger stroke length, it suffers from certain drawbacks. First, the stop members may be subject to slippage on the plunger shaft which can cause inaccurate volumetric delivery, particularly after a long period of use where the stop member has moved incrementally over time. Second, it can be difficult to precisely align the stop member with a calibration mark, particularly when the stop member is not disposed precisely horizontally relative to the vertical shaft. Third, when the stop member is internal to the plunger mechanism, disassembly of the liquid dispenser is necessary to adjust the liquid volume being delivered. Alternatively, when the stop member is external to the dispenser, it can be unsightly, collect dirt and debris, and be subject to accidental misalignment. Finally, stop members are often designed to be firmly attached to the plunger, e.g., using screws to hold them in place, which can make changing the volume delivery rate very inconvenient.

As an improvement over the use of collars and stop members for adjusting the volumetric delivery, it has been proposed to provide a plurality of channels on the plunger, where the channels are of different lengths. A stop member is then provided on the barrel or elsewhere on the dispenser, where the stop member can be rotated to travel in a preselected one of the channels in order to limit the relative stroke of the plunger to the barrel. This design is described in U.S. Pat. No. 4,081,111. Although an improvement over the use of collars and stop members, the design of the '111 patent still suffers from disadvantages. In particular, the channels on the shaft extend from the upper end downward so that the channels can be changed only when the plunger is in its fully depressed position relative to the barrel. This requires that the plunger be depressed through a discharge cycle before the volume can be changed, which can be wasteful. Second, the grooves in the plunger shaft extend upward out of the barrel when the plunger is in its upward position. This allows dirt and debris to gather in the grooves which can interfere with the operation of the dispenser and potentially carry contaminants into the barrel where the liquid is collected prior to delivery. Finally, the design disclosed in the '111 patent requires a separate external selector mechanism for rotating the stop member which travels in the channels formed on the plunger. Such a method of construction is relatively complex and expensive.

Other patents of interest include U.S. Pat. Nos. 3,485,090; 2,521,433; 2,123,737; 1,917,678; and 1,724,766.

For the above reasons, it would be desirable to provide plunger-type liquid dispensers which may be mechanically adjusted in order to provide for the precise delivery of different volumetric amounts of the liquid. It would be particularly desirable if the volume of liquid being delivered could be adjusted without disassembly of the dispenser and if the mechanism for adjusting the volumetric delivery could be fully enclosed within the dispenser. In particular, it would be desirable if the volumetric delivery rate could be adjusted while the plunger is in its upward or loaded position so that there would never be a need to discharge a liquid volume prior to selecting the needed volumetric delivery rate for the next dispensing cycle.

SUMMARY OF THE INVENTION

The present invention provides a measured volume liquid dispenser comprising an elongate barrel and plunger slidably mounted within a cylindrical bore formed in the barrel. The barrel includes an inlet check valve located at the bottom of the cylindrical bore so that liquid may be drawn into the bore during an upstroke of the plunger. The plunger includes an axial passage formed therein and an outlet check valve disposed in the passage. The outlet check valve allows liquid to be dispensed as the plunger is depressed in a downstroke in the barrel but provides a seal during the plunger upstroke so that the liquid may be drawn into the cylindrical bore through the inlet check valve. The liquid dispenser is intended to be mounted in a bottle or other liquid container in a conventional manner.

The mechanism for adjusting the volumetric delivery of the dispenser by limiting the travel or stroke of the plunger in the barrel is provided wholly within the barrel. The mechanism is responsive to rotation of the plunger relative to the barrel and limits the downstroke of the plunger so that rotational adjustment may be achieved while the plunger is in its upward, loaded configuration. In this way, the volume adjustment mechanism is fully enclosed within the dispenser and less subject to contamination and accidental misadjustment. Additionally, since the adjustment of the volumetric delivery rate can be achieved while the plunger is in its upward, loaded configuration, the need to discharge liquid prior to selection of a new volumetric amount is eliminated, reducing the amount of liquid wasted as discussed above in relation to the Background Art.

In the exemplary embodiments, the mechanism for selectively limiting the downward travel of the plunger may comprise an annular channel formed near the top of the cylindrical bore and a plurality of axial channels having different lengths depending downward from the annular channel. Projection is formed on the plunger, and the plunger may be rotated so that the projection is aligned with a desired axial channel. The downstroke of the plunger is then limited by the channel length so that the volume of liquid delivered is a fixed percentage of the total amount of liquid in the barrel. Alternatively, an annular channel may be formed about the plunger with a plurality of axial channels extending upwardly from the annular channel. Projection may then be provided from the cylindrical bore of the barrel, again allowing rotation of the plunger while in its fully upward, loaded configuration. The downward travel of the plunger is again limited by the axial channel length. Both of these configurations avoid the need to discharge liquid from the barrel prior to volumetric adjustment by rotation of the plunger, as required by the previous dispensers discussed above.

DESCRIPTION OF THE PREFERRED EMBODIMENTS

Figure 1:
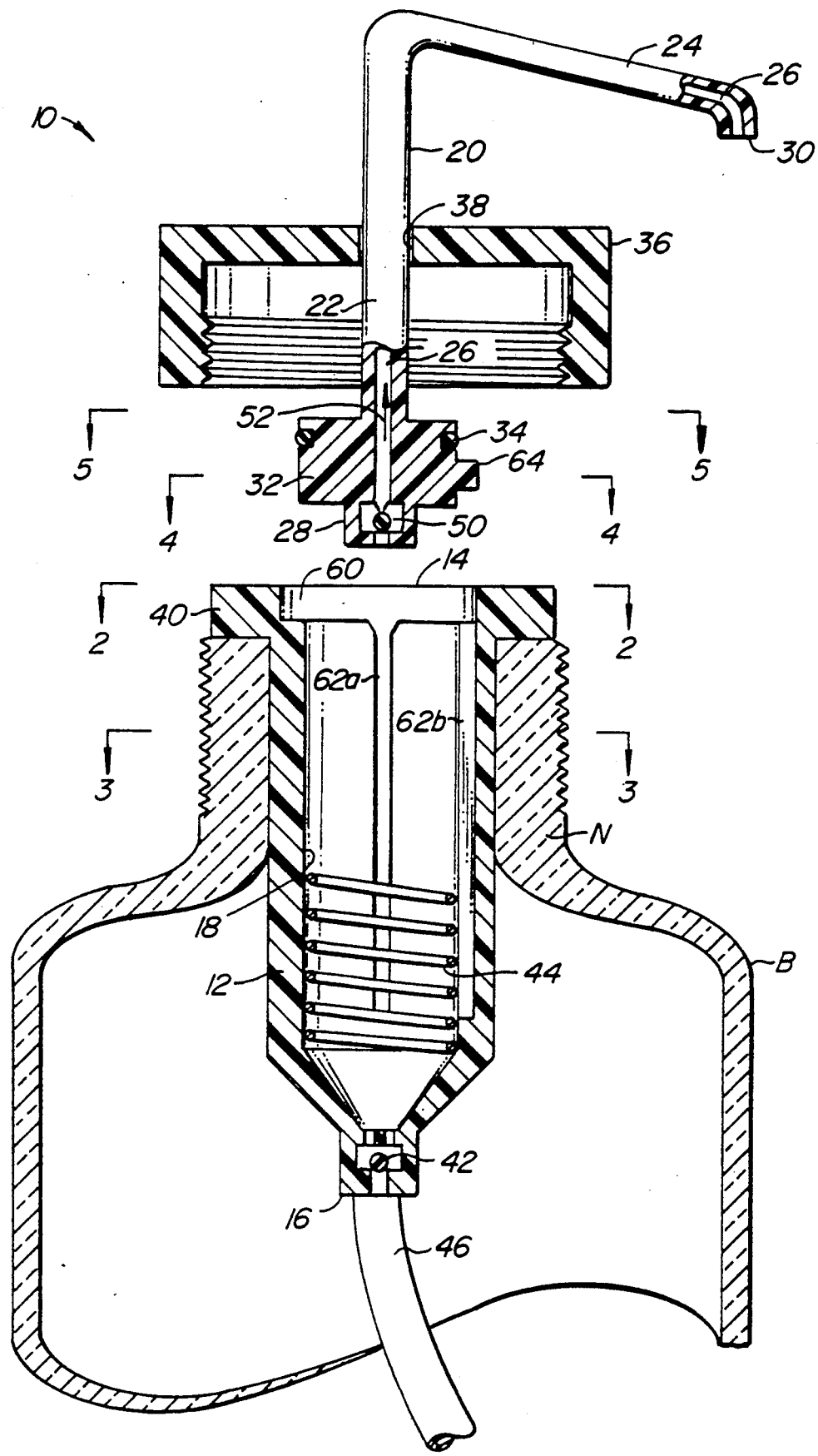
FIG. 1 is an exploded side view illustrating a first embodiment of the liquid dispensing device of the present invention, shown in partial section.
Figure 2:
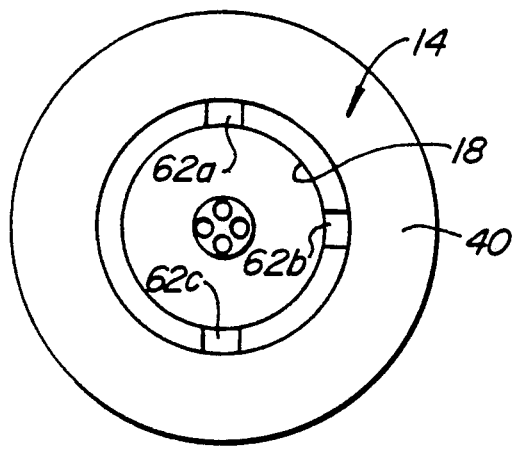
FIG. 2 is a cross-sectional view taken along line 2—2 of FIG. 1.
Figure 3:
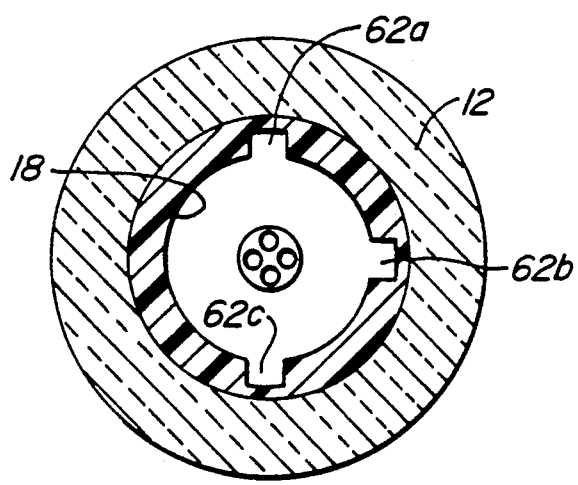
FIG. 3 is a cross-sectional view taken along line 3—3 of FIG. 1.
Figure 4:
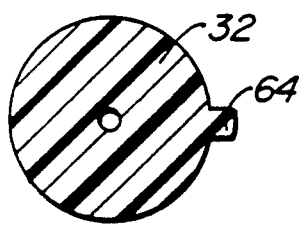
FIG. 4 is a cross-sectional view taken along line 4—4 of FIG. 1.
Figure 5:
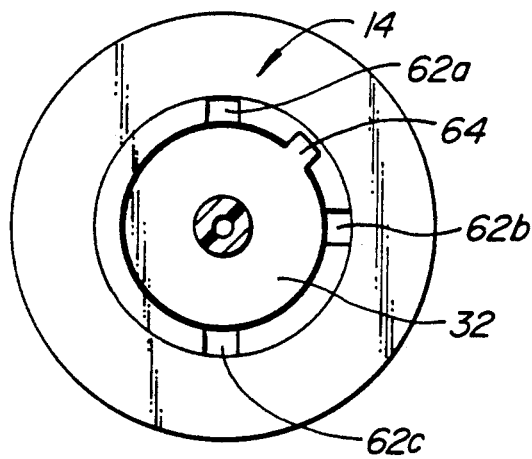
FIG. 5 is a cross-sectional view taken along line 5—5 of FIG. 1.

Referring to FIGS. 1-5, a liquid dispenser 10 constructed in accordance with the principles of the present invention includes an elongate barrel 12 having a top end 14 and a bottom end 16 together with a cylindrical bore 18 extending axially between the top end and the bottom end. The liquid dispensing device 10 further includes a plunger element 20 including a shank portion 22 and a dispenser or nozzle portion 24. An axial passage 26 extends from a lower end 28 of the plunger 20 axially upward through the shank portion and extends to a distal tip 28 of the dispenser portion 24.

A shoulder or flange 32 is formed in the shank region 22 of the plunger element 20. The flange has an external diameter which is chosen to conform to the internal diameter of cylindrical bore 18 so that the flange is free to reciprocate upwardly and downwardly within said cylindrical bore. An O-ring 34 is disposed about the outer periphery of flange 32 in order to effect a seal between the flange and the inner wall of the cylindrical bore.

A threaded cap 36 includes an aperture 38 adapted to receive the shank portion 22 of the plunger element 20 therethrough. The size of the cap 36 will be selected to allow mounting on a bottle B or other liquid receptacle, typically by conventional threaded connections. Generally, the outer diameter of the elongate barrel 12 will be chosen to fit within a threaded neck portion N of the bottle B, with the barrel 12 including an upper flange 40 which is sized to rest on the upper lip of the neck portion N. In this way, the cap 36 can be screwed down onto the threaded neck N in order to hold both the elongate barrel 12 and the plunger element 20 in place within the bottle B.

An inlet check valve 42 is provided at the bottom end 16 of the barrel 12. The check valve allows liquid in bottle B to enter the cylindrical bore 18 as the plunger element 20 is drawn upward. Usually, a spring element 44 is provided to automatically return the plunger element 20 to its upward configuration and refill the cylindrical bore 18 with liquid. Optionally, an inlet tube 46 is connected to the inlet check valve 42 so that liquid from the bottom of the bottle cap can be brought into the barrel 12.

An outlet check valve 50 is provided within the axial passage 26 in plunger element 20. The outlet check valve 50 allows unidirectional flow through the passage 26 in the direction of arrow 52. The outlet check valve thus allows liquid to flow through passage 26 and be expelled from the distal end of plunger 20 as the plunger is depressed downward in the barrel 12 (assuming that the barrel is filled with liquid). When the plunger 20 is drawn upward within chamber 12, however, the outlet check valve 50 will seal so that a negative pressure is created which draws liquid in through inlet check valve 42.

As described thus far, the liquid dispenser 10 is of generally conventional construction. Moreover, certain modifications may be made to the structure as described without departing from the present invention. In particular, the need to provide an expanded shoulder or flange portion 32 on the shank 22 of plunger element 20 is not necessary. The shank 22 may be selected to have a diameter along its entire length which corresponds to the inner diameter of cylindrical bore 18. For larger diameter bores, however, it is convenient to form only a portion of the shank at the larger diameter.

The present invention provides a novel and particularly convenient mechanism for adjusting the length of the downstroke of plunger element 20. By such adjustment of the downstroke length, the volumetric delivery of the liquid dispensing device 10 can be adjusted so that the dispenser provides for the delivery of premeasured volumes of liquid. The mechanism includes an annular channel 60 formed about the upper end of the inner wall of cylindrical bore 18. A plurality of axial channels 62 extend downward from the annular channel 60. A projection 64 is formed on the flange 32 of the plunger element 20. When the plunger 20 is in its raised position, projection 64 will be received in annular channel 60 so that the plunger will be able to freely rotate relative to the barrel 12. In this way, the projection 64 may be brought into alignment with any one of the channels 62a and 62b and 62c, each of which have different lengths. Once the projection is brought into such alignment, the plunger element 20 may be depressed downward relative to barrel 12 so that liquid can be dispensed in a conventional manner. The length of downward travel, however, is limited by the length of the particular axial channel 62 which has been selected. The amount of volume delivered by the dispenser 10 will thus be a function of the length of the channel 62 which has been selected. A channel which is one-half the length of the barrel will generally deliver about one-half of the total volume which is held within the axial bore 18 of the barrel 12. Correspondingly longer and shorter strokes will deliver correspondingly larger and smaller liquid volumes.

The structure just described has the particular advantage that the plunger element 20 may be rotated to select a particular volume while the plunger is in its raised position with the cylindrical bore 18 of barrel 12 completely full of liquid. Thus, there is no need to discharge fluid from the chamber prior to selecting the desired volume. As discussed above, the need to discharge the chamber can be wasteful since there may be no need at that time to utilize the particular volume of liquid which is set in a dispenser. The dispenser 10 is further advantageous since the entire mechanism which controls the stroke length of plunger 20 is maintained within the interior of barrel 12. In this way, the mechanism will generally remain free of contaminants which might be introduced if the mechanism extended outward from the barrel 12.

Indicia (not illustrated) may be provided on the top of cap member 36 in order to allow the user to align the nozzle portion 24 of the plunger 20 with the desired axial channel 62 corresponding to a particular volumetric delivery. Alternatively, indicia (not illustrated) may be provided on the upper surface of flange 40 and the cap 36 may be made of transparent material allowing the user to read through the cap to the indicia. The latter construction is advantageous in that it makes assembly of the dispenser 10 easier since the alignment between the channel 62 and the cap 36 is not critical.

Note that the depth of channels 62a, 62b and 62c will usually be less than that illustrated in order to reduce leakage past O-ring 32 as the plunger is raised and lowered within the cylindrical bore 18 of barrel 12. By properly choosing the O-ring 32 and the depth of channels 62, leakage can be reduced to a very low level.

Figure 7:
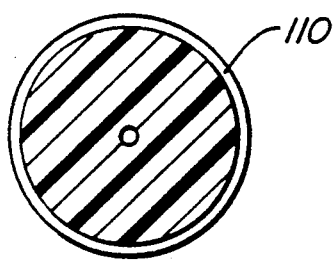
FIG. 7 is a cross-sectional view taken along line 7—7 of FIG. 6.
Figure 8:
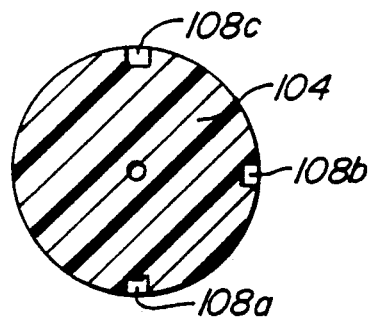
FIG. 8 is a cross-sectional view taken along line 8—8 of FIG. 6.
Figure 6:
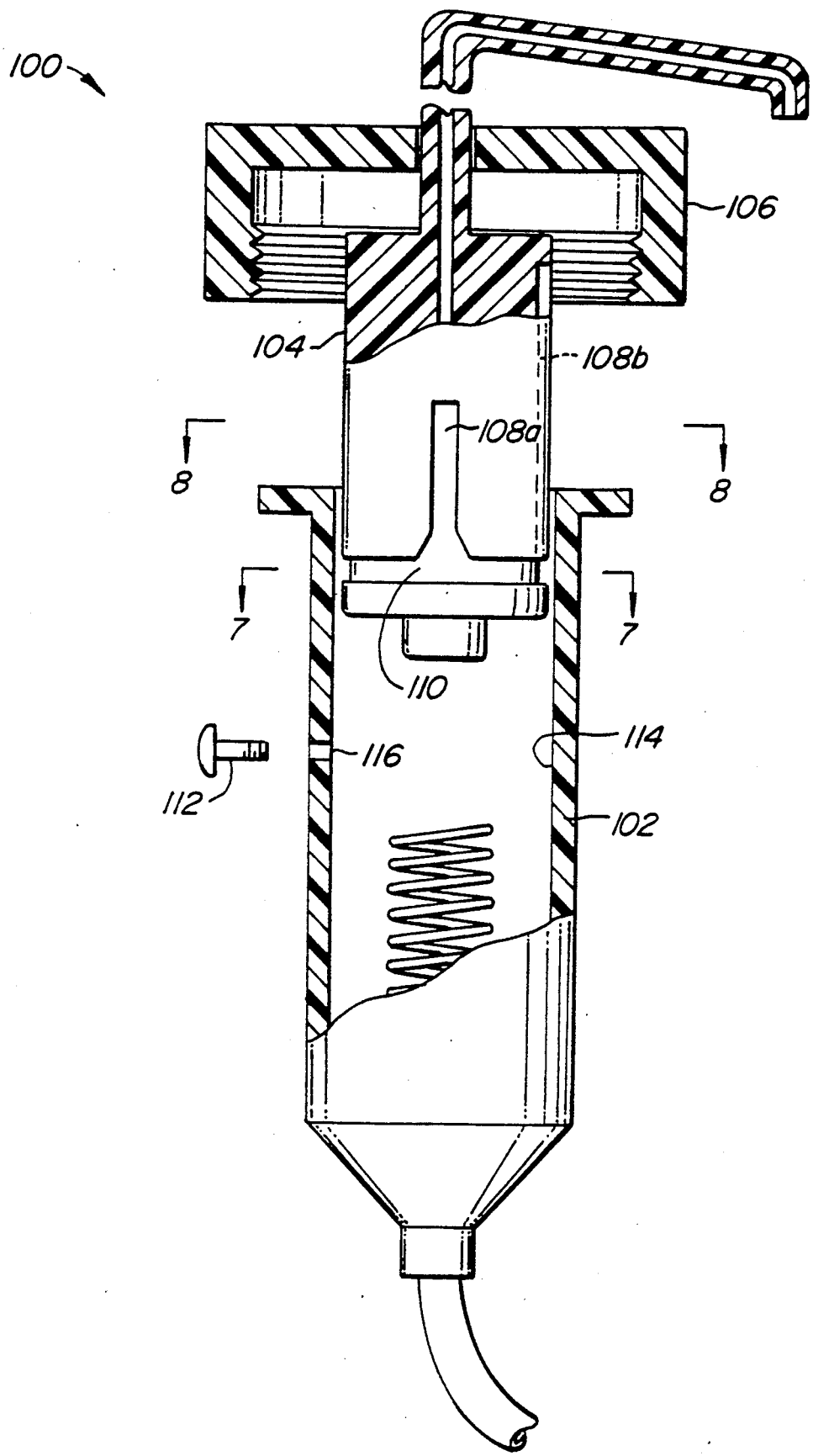
FIG. 6 is an exploded side view illustrating a second embodiment of the liquid dispensing device of the present invention, shown in partial section.

Referring now to FIGS. 6–8, a second embodiment of a liquid dispenser 100 constructed in accordance with the principles of the present invention will be described. The dispenser 100 includes an elongate barrel 102, a plunger 104, and a cap 106. The barrel 102, plunger 104 and cap 106, are generally mounted within a bottle (not illustrated) in a manner similar to that described for dispenser 10 above. The primary difference between the dispenser 100 and dispenser 10 (FIGS. 1–5) is that dispenser 100 relies on axial channels 108 which are formed on the outer surface of plunger 104 rather than in the wall of cylindrical bore 18.

Plunger 104 includes an annular channel 110 which is formed near the bottom of the plunger, and axial channels 108 are formed to extend upwardly from the annular channel. A screw 112 or other removable inward projection is disposed to project inwardly from the inner cylindrical wall 114 of elongate barrel 102. After the plunger 108 is inserted into the cylindrical bore 114 and the annular channel 110 aligned with an aperture 116, the screw 112 may be put in place. The plunger 104 will then be free to rotate so that the screw 112 may be aligned with any one of the axial channels 108. The downstroke of the plunger 104 is thus limited by the length of channel 108, in a manner analogous to that described for dispenser 10. Use of the removable screw 112 allows convenient assembly and disassembly of the dispenser 100.

Although the foregoing invention has been described in detail for purposes of clarity of understanding, it will be obvious that certain modifications may be practiced within the scope of the appended claims.

What is claimed is:

1. A measured volume liquid dispenser comprising:
   an elongate barrel having top and bottom ends and a cylindrical bore extending therebetween;
   an inlet check valve at the bottom end of the cylindrical bore;
   means at the top end for securing the elongate barrel to an opening in a liquid container;
   a plunger slidably disposed within the cylindrical bore of the elongate barrel, said plunger having top and bottom ends and an axial passage extending therebetween;
   an outlet check valve disposed within the axial passage; and
   means responsive to rotation of the plunger for selectively limiting the downward travel of the plunger in order to dispense a measured volume of liquid, wherein said means for selectively limiting is located wholly within the barrel and comprises a plurality of axial channels formed in the cylindrical bore and means on the plunger for selectively engaging an individual channel corresponding to a premeasured volume.

2. A measured volume liquid dispenser as in claim 1, wherein the means for securing comprises a flange.

3. A measured volume liquid dispenser comprising:
   an elongate barrel having top and bottom ends and a cylindrical bore extending therebetween;
   an inlet check valve at the bottom end of the cylindrical bore;
   means at the top end for securing the elongate barrel to an opening in a liquid container;
   a plunger slidably disposed within the cylindrical bore of the elongate barrel, said plunger having top and bottom ends and an axial passage extending therebetween;
   an outlet check valve disposed within the axial passage; and
   means responsive to rotation of the plunger for selectively limiting the downward travel of the plunger in order to dispense a measured volume of liquid, wherein said means for selectively limiting is located wholly within the barrel and comprises an annular channel formed near the top of the cylindrical bore, a plurality of axial channels of different lengths formed in the cylindrical bore and depending in a downward direction from the annular channel, and a projection formed on the plunger, whereby the plunger may be rotated while the projection is in the annular channel until the projection is aligned with a desired axial channel and the plunger may then be pressed downward to dispense a volume of liquid determined by the length of the selected axial channel.

4. A measured volume liquid dispenser as in claim 3, wherein the means for securing comprises a flange.

5. A measured volume liquid dispenser as in claim 3, wherein the projection is a screw.

6. A measured volume liquid dispenser comprising:
   an elongate barrel having top and bottom ends and a cylindrical bore extending therebetween;
   an inlet check valve at the bottom end of the cylindrical bore;
   means at the top end for securing the elongate barrel to an opening in a liquid container;
   a plunger slidably disposed within the cylindrical bore of the elongate barrel, said plunger having top and bottom ends and an axial passage extending therebetween;
   an outlet check valve disposed within the axial passage; and
   means responsive to rotation of the plunger for selectively limiting the downward travel of the plunger in order to dispense a measured volume of liquid, wherein said means for selectively limiting is located wholly within the barrel and comprises an annular channel formed about the plunger, a plurality of axial channels of different lengths formed in the plunger and extending upwardly from the annular channel, and a projection formed on the cylindrical bore of the elongate barrel, whereby the plunger may be rotated while in its fully charged upward position with the projection present in the annular channel on the plunger until the projection is aligned with a desired axial channel and the plunger may then be pressed downward to dispense a volume of liquid determined by the length of the selected axial channel.

7. A measured volume liquid dispenser as in claim 6, wherein the means for securing comprises a flange.

8. A measured volume liquid dispenser as in claim 6, wherein the projection is a screw.

* * * * *